(12) United States Patent
Fujii et al.

(10) Patent No.: US 12,397,877 B2
(45) Date of Patent: Aug. 26, 2025

(54) COMPONENT AND COMMUNICATION SYSTEM

(71) Applicant: Shimano Inc., Osaka (JP)

(72) Inventors: Kazuhiro Fujii, Osaka (JP); Yoshiyuki Kasai, Osaka (JP); Akihiro Nozaki, Osaka (JP); Tomohiro Takimoto, Osaka (JP)

(73) Assignee: Shimano Inc., Osaka (JP)

( * ) Notice: Subject to any disclaimer, the term of this patent is extended or adjusted under 35 U.S.C. 154(b) by 221 days.

(21) Appl. No.: 17/959,531

(22) Filed: Oct. 4, 2022

(65) Prior Publication Data

US 2023/0025889 A1 Jan. 26, 2023

Related U.S. Application Data

(63) Continuation of application No. 17/360,175, filed on Jun. 28, 2021.

(30) Foreign Application Priority Data

Jul. 6, 2020 (JP) .................................. 2020-116591

(51) Int. Cl.
| | | |
|---|---|---|
| *B62M 6/45* | (2010.01) | |
| *B62K 23/02* | (2006.01) | |
| *B62M 6/90* | (2010.01) | |
| *H04W 4/40* | (2018.01) | |

(52) U.S. Cl.
CPC .............. *B62M 6/45* (2013.01); *B62K 23/02* (2013.01); *B62M 6/90* (2013.01); *H04W 4/40* (2018.02)

(58) Field of Classification Search
CPC .... B62M 6/45; B62M 6/90; B62M 2025/006; B62M 25/08; B62M 25/00; B62K 23/02; B62K 2025/048; H04W 4/40; H04W 4/48; B62J 45/20; B62J 2001/085; B62J 99/00; B62L 3/00
See application file for complete search history.

(56) References Cited

U.S. PATENT DOCUMENTS

| | | | |
|---|---|---|---|
| 2005/0086008 A1* | 4/2005 | DiGianfilippo | ......... G07F 13/06 |
| | | | 702/19 |
| 2017/0203814 A1* | 7/2017 | Kurokawa | ............. B62K 23/00 |
| 2018/0076840 A1* | 3/2018 | Masuda | ............... H04B 1/3827 |
| 2018/0257736 A1* | 9/2018 | Komatsu | .................. B62J 45/41 |
| 2020/0010144 A1* | 1/2020 | Kondo | ..................... B62J 45/00 |

FOREIGN PATENT DOCUMENTS

| | | |
|---|---|---|
| CN | 1004796567 A | 7/2015 |
| DE | 10 2013 006 007 A1 | 10/2014 |
| DE | 10 2015 122 054 A1 | 6/2016 |
| DE | 10 2017 113 940 A1 | 1/2018 |

(Continued)

*Primary Examiner* — Donald J Wallace
(74) *Attorney, Agent, or Firm* — Global IP Counselors LLP; David Tarnoff

(57) ABSTRACT

A component is configured to be mounted on a human-powered vehicle. The component includes a communication device. The communication device is configured to receive predetermined information sent from a transmission device of the human-powered vehicle. The predetermined information includes at least some of first information that the transmission device receives from an operating device mounted to the human-powered vehicle.

19 Claims, 10 Drawing Sheets

(56) References Cited

FOREIGN PATENT DOCUMENTS

| | | |
|---|---|---|
| DE | 10 2017 218 168 A1 | 4/2018 |
| DE | 10 2018 124 602 A1 | 4/2019 |
| JP | 2013-66103 A | 4/2013 |
| JP | 2015-27861 A | 2/2015 |
| JP | 2018-39466 A | 3/2018 |
| JP | 2019-172213 A | 10/2019 |
| JP | 2022-14318 A | 1/2022 |

* cited by examiner

COMPONENT AND COMMUNICATION SYSTEM

CROSS-REFERENCE TO RELATED APPLICATIONS

This application is a continuation application U.S. application Ser. No. 17/360,175, filed Jun. 28, 2021. The entire disclosure of U.S. application Ser. No. 17/360,175 is hereby incorporated herein by reference. This application claims priority to Japanese Patent Application No. 2020-116591, filed on Jul. 6, 2020. The entire disclosure of Japanese Patent Application No. 2020-116591 is hereby incorporated herein by reference.

BACKGROUND

Technical Field

The present invention generally relates to a component and a communication system for human-powered vehicles.

Background Information

Some human-powered vehicles are provided with a communication device that is configured to perform communications between components. Japanese Laid-Open Patent Publication No. 2018-39466 discloses an example of a bicycle component including a communication device configured to perform communication in response to operation of an operating portion.

SUMMARY

One object of the present disclosure is to provide a component and a communication system that perform appropriate communication in human-powered vehicles.

In accordance with a first aspect of the present disclosure, a component that is configured to be mounted on a human-powered vehicle. The component includes a communication device. The communication device is configured to receive predetermined information sent from a transmission device of the human-powered vehicle. The predetermined information includes at least some of first information that the transmission device receives from an operating device mounted to the human-powered vehicle. The component according to the first aspect allows at least some of information that the transmission device receives from an operating device mounted to the human-powered vehicle to be transmitted to the communication device.

In accordance with a second aspect of the present disclosure, the component according to the first aspect is configured so that the communication device is configured to receive the predetermined information on a wireless signal. The component according to the second aspect allows the communication device to wirelessly receive predetermined information.

In accordance with a third aspect of the present disclosure, the component system according to the first or second aspect further comprises a motor unit configured to apply a propulsion force to the human-powered vehicle. The component according to the third aspect can apply a propulsion force to the human-powered vehicle.

In accordance with a fourth aspect of the present disclosure, the component according to any one of the first aspect to the third aspect is configured so that the operating device is configured to communicate with the transmission device using a wireless signal. The component according to the fourth aspect performs appropriate wirelessly communication with the transmission device.

In accordance with a fifth aspect of the present disclosure, the component according to any one of the first aspect to the fourth third aspect is configured so that the communication device is electrically connected to the transmission device by a wire to communicate with the transmission device using a wire signal. The component according to the fifth aspect performs appropriate wired communication with the transmission device.

In accordance with a sixth aspect of the present disclosure, the component according to any one of the first aspect to the fifth aspect is configured so that the first information includes at least one of information related to the transmission device and information related to the component. The component according to the sixth aspect performs appropriate communication.

In accordance with a seventh aspect of the present disclosure, the component according to any one of the first aspect to the sixth aspect is configured so that the predetermined information includes at least one of information related to the transmission device and information related to the component. In the component according to the seventh aspect performs appropriate communication.

In accordance with an eighth aspect of the present disclosure, the component according to any one of the first aspect to the seventh aspect is configured so that the first information conforms to the predetermined information. In the component according to the eighth aspect performs appropriate communication.

In accordance with a ninth aspect of the present disclosure, the component according to any one of the first aspect to the eighth aspect is configured so that the component is configured to receive a signal sent from the operating device. In the component according to the ninth aspect, the component can receive a signal sent from the operating device.

In accordance with a tenth aspect of the present disclosure, a communication system comprises the component according to any one of the first aspect to the ninth aspect and further comprises at least one battery configured to supply electric power to at least one of the component, the operating device and the transmission device. In the communication system according to the tenth aspect at least one of the component, the operating device and the transmission device can receive electric power from at least one battery.

In accordance with an eleventh aspect of the present disclosure, the communication system according to the tenth aspect is configured the battery is configured to supply electric power to the component and the transmission device. In the communication system according to the eleventh aspect, at least the component and the transmission device can receive electric power from the battery.

In accordance with a twelfth aspect of the present disclosure, the communication system according to the eleventh aspect is configured so that the battery is configured to supply electric power to the component and the operating device. In the communication system according to the twelfth aspect, at least the component and the transmission device can receive electric power from the battery.

In accordance with a thirteenth aspect of the present disclosure, the communication system according to any one of the ten aspect to the twelfth aspect is configured so that the battery includes a first configured to supply electric power to the transmission device and the component and a third battery configured to supply electric power to the operating device. In the communication system according to the thirteenth aspect, the electronic controller appropriately controls at least one of the operating device, electric power can be appropriately supplied to the transmission device and the component a first battery and power can be appropriately supplied to a the operating device using a third battery.

The component and the communication system according to the present disclosure perform appropriate communication.

BRIEF DESCRIPTION OF THE DRAWINGS

Referring now to the attached drawings which form a part of this original disclosure.

DETAILED DESCRIPTION OF EMBODIMENTS

Selected embodiments will now be explained with reference to the drawings. It will be apparent to those skilled in the bicycle field from this disclosure that the following descriptions of the embodiments are provided for illustration only and not for the purpose of limiting the invention as defined by the appended claims and their equivalents.

First Embodiment

Figure 1:
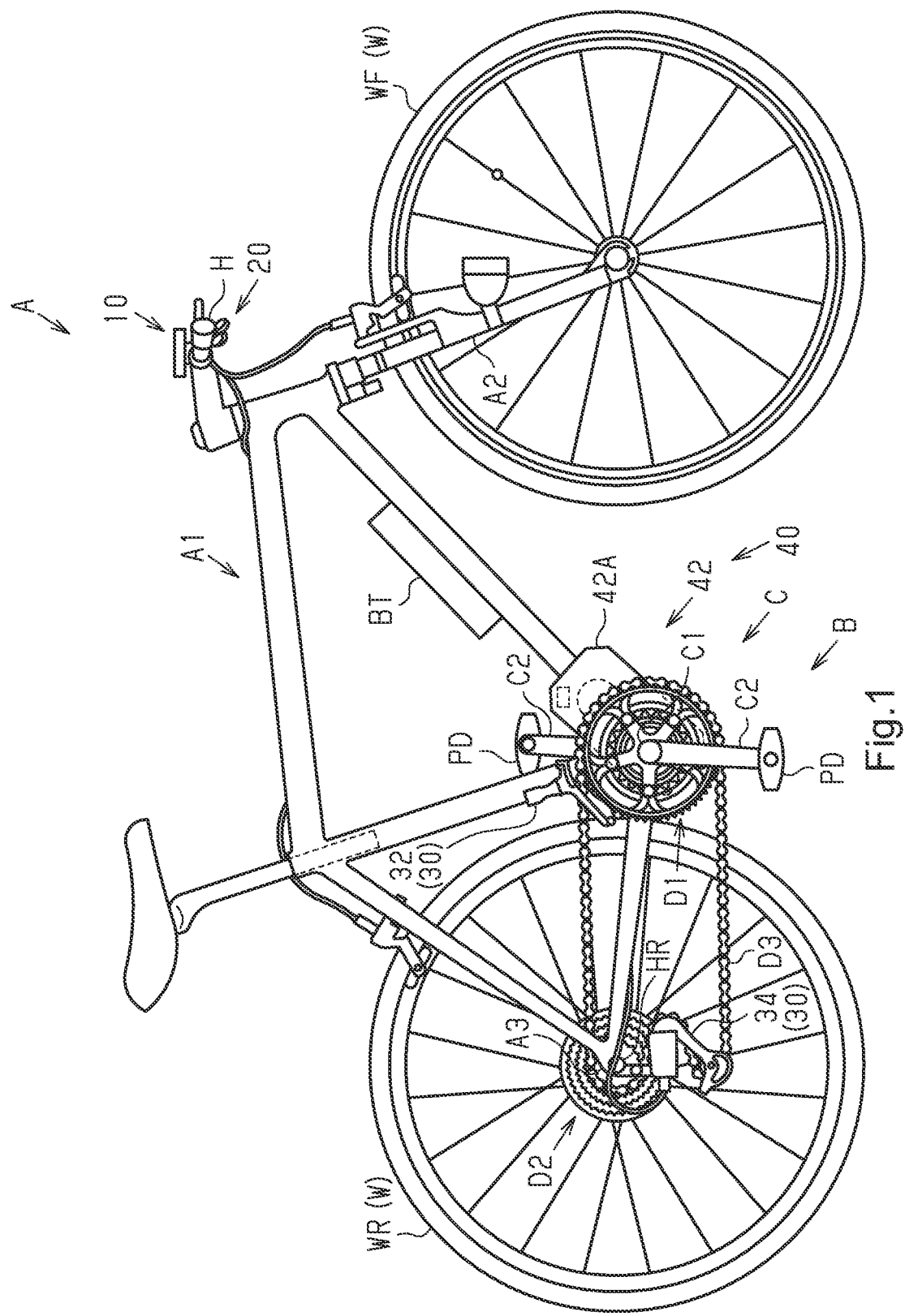
FIG. 1 is a side elevational view of a human-powered vehicle including a communication system, a component and a control system in accordance with a first embodiment.
Figure 2:
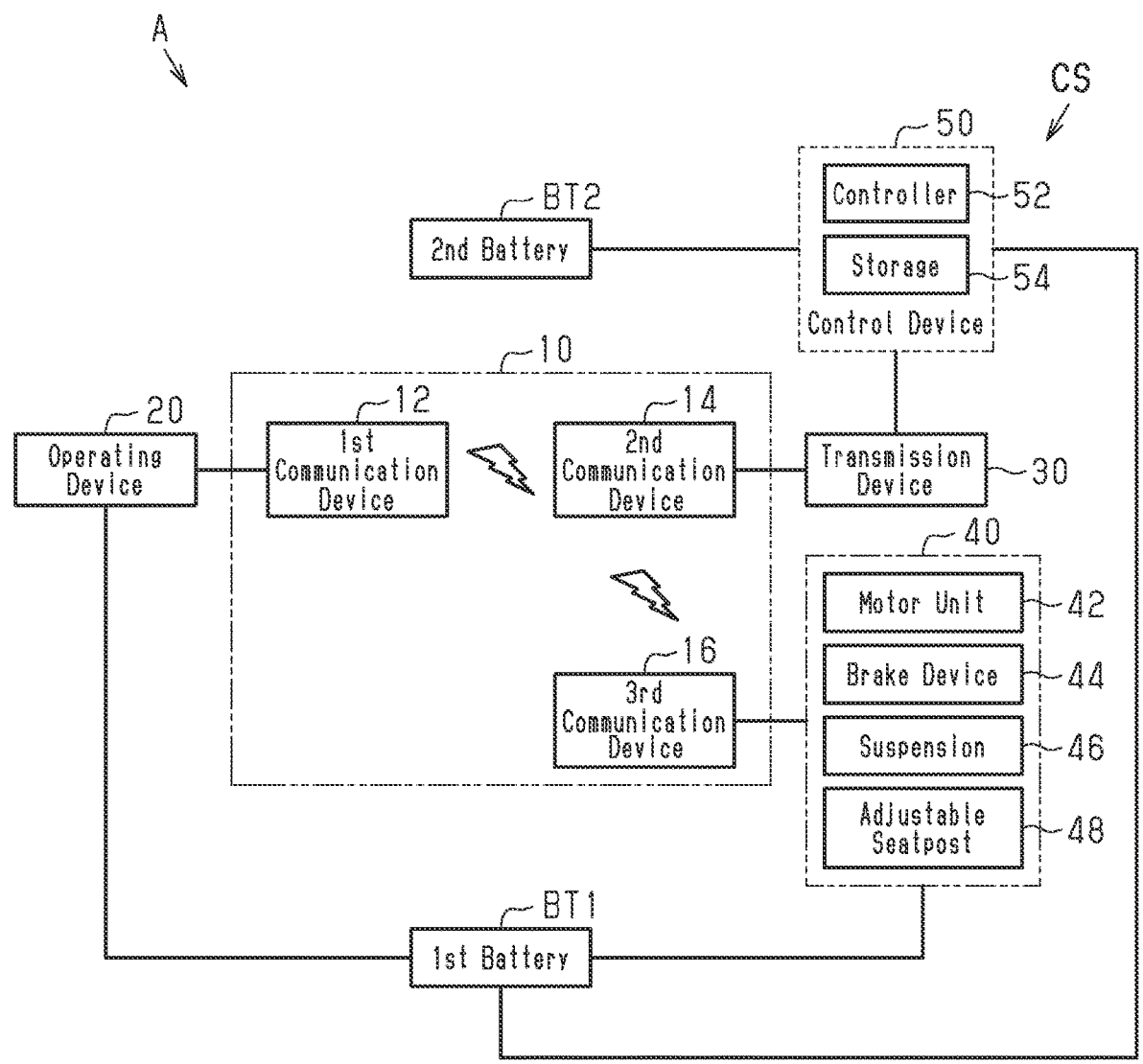
FIG. 2 is a block diagram showing an electrical connection relationship between the control device and various components in accordance with the first embodiment.
Figure 3:
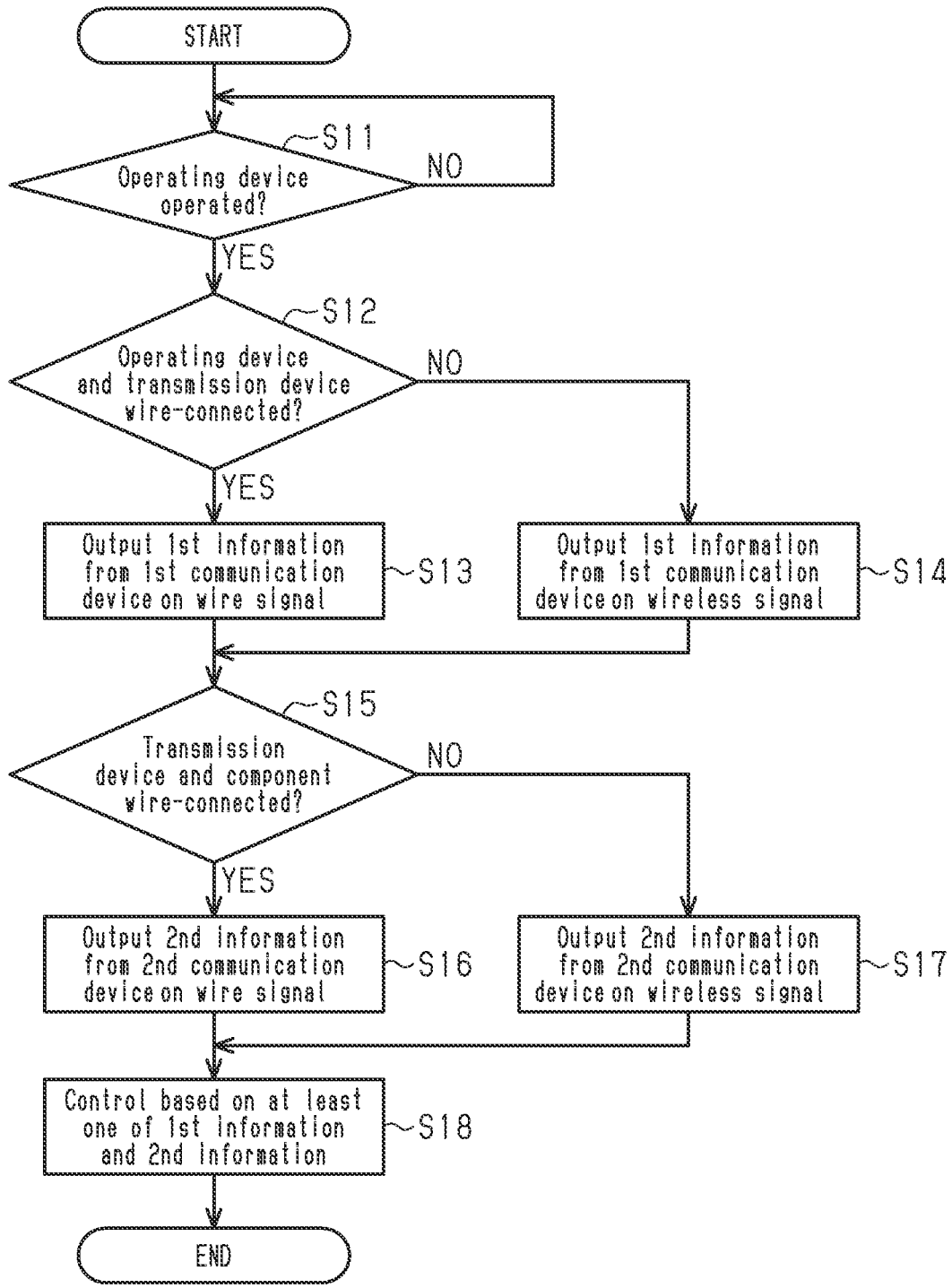
FIG. 3 is a flowchart showing an example of control executed by an electronic controller of the first embodiment.

A human-powered vehicle A including a communication system 10 will now be described with reference to FIGS. 1 to 3. A human-powered vehicle refers to a vehicle that at least partially uses human force as a prime mover to travel, and includes vehicles that assist human force with electric power. The human-powered vehicle does not include vehicles using only a prime mover that is not human force. In particular, the human-powered vehicle does not include vehicles that use only an internal combustion engine as the prime mover. The human-powered vehicle is generally assumed to be a small, light vehicle that does not typically require a license for driving on a public road. More specifically, the illustrated human-powered vehicle A is a trekking bike. The human-powered vehicle A further includes a frame A1, a front fork A2, a wheel W, a handlebar H, and a drivetrain B. The wheel W includes a front wheel WF and a rear wheel WR.

The drivetrain B is of, for example, a chain-drive type. The drivetrain B includes a crank C, a front sprocket assembly D1, a rear sprocket assembly D2, and a chain D3. The crank C includes a crank axle C1 rotatably supported by the frame A1 and two crank arms C2 respectively provided on opposite ends of a crank axle C1. A pedal PD is rotatably coupled to the distal end of each crank arm C2. The drivetrain B can be of any type such as a belt-drive type or a shaft-drive type.

The front sprocket assembly D1 is provided on the crank C to rotate integrally with the crank axle C1. The rear sprocket assembly D2 is provided on a hub HR of the rear wheel WR. The chain D3 runs around the front sprocket assembly D1 and the rear sprocket assembly D2. A human driving force applied to the pedals PD by an occupant who is riding the human-powered vehicle A is transmitted via the front sprocket assembly D1, the chain D3, and the rear sprocket assembly D2 to the rear wheel WR.

The communication system 10 includes a first communication device 12, a second communication device 14 and a third communication device 16. Unless otherwise expressly limited, the term "communication device" as used herein refers to hardware capable of transmitting and/or receiving an analog or digital signal either by a wire or wirelessly. The term "communication device" does not include a human. The term "wireless communication device" as used herein refers to hardware capable of transmitting and/or receiving an analog or digital signal wirelessly, while the term "wired communication device" as used herein refers to hardware capable of transmitting and/or receiving an analog or digital signal via a wire.

The first communication device 12 is configured to be connected to an operating device 20 mounted on the human-powered vehicle A. The second communication device 14 is configured to be connected to a transmission device 30 of the human-powered vehicle A. The third communication device 16 is configured to be connected to a component 40 of the human-powered vehicle A differing from the transmission device 30. The third communication device 16 is connected to the component 40 that configured to be mounted on the human-powered vehicle A and that differs from the operating device 20 and the transmission device 30. The operating device 20, the transmission device 30, and the component 40 are mounted on the single human-powered vehicle A. The component 40 has a configuration mounted on the human-powered vehicle A that differs from the operating device 20 and the transmission device 30. In the communication system 10, the second communication device 14 receives first information that is sent from the first communication device 12 in response to operation of the operating device 20, and the third communication device 16 of the component 40 receives second information that includes at least some of the first information sent from the second communication device 14. Thus, in this way, the third communication unit device 16 is configured to receive predetermined information sent from the transmission device 30 of the human-powered vehicle A.

The first communication device 12 includes at least a transmitter configured to transmit a signal that includes information. Preferably, the first communication device 12 also includes a receiver configured to receive a signal that includes information. The second communication device 14 includes both a transmitter configured to transmit a signal that includes information and a receiver configured to receive a signal that includes information. The third communication device 16 includes at least a receiver configured to receive a signal that includes information. Preferably, the third communication device 16 also includes a transmitter configured to transmit a signal that includes information. The first communication device 12 and the second communication device 14 are connected to perform wired or wireless communication with each other. The first communication device 12 and the second communication device 14 communicate with each other through, for example, power line communication (PLC), a controller area network (CAN), or a universal asynchronous receiver/transmitter (UART). The second communication device 14 and the third communication device 16 are connected to perform wired or wireless communication with each other.

The communication system 10 further includes a battery BT that is configured to supply electric power to at least one of the operating device 20, the transmission device 30, and the component 40. The operating device 20 and the component 40 are connected by a power line. The operating device 20 and the battery BT can be connected by a power line. The battery BT includes one or more battery elements. The battery elements include a rechargeable battery.

The human-powered vehicle A also includes a control device 50. The control device 50 includes an electronic controller 52 and storage 54. As explained below, the electronic controller 52 can control the communication system 10, the transmission device 30 and the component 40. The storage 54 stores various types of information. The control device 50 and the communication system 10 constitutes a control system CS for the human-powered vehicle A. The electronic controller 52 is formed of one or more semiconductor chips that are mounted on a circuit board. The term "electronic controller" as used herein refers to hardware that executes a software program, and does not include a human. Hereinafter, the electronic controller 52 will be simply referred to as the controller 52.

The battery BT is connected to the controller 52 of the control device 50 to perform wired or wireless communication with the controller 52. The battery BT and the controller 52 of the control device 50 can be connected by connection terminals. In a case where the controller 52 of the control device 50 is provided on the battery BT, the third communication device 16 of the component 40 and the controller 52 can be wire-connected. The battery BT can include a first battery BT1 that is configured to supply electric power to the operating device 20 and the component 40, and the second battery BT2 that is configured to supply electric power to the transmission device 30. At least one of the first battery BT1 and the second battery BT2 can be configured to supply electric power to all of the operating device 20, the transmission device 30, and the component 40. Thus, the first battery BT1 is configured to supply electric power to the component 40 and the operating device 20. The operating device 20 and the transmission device 30 can be connected by a power line. In a case where the operating device 20 is not connected to the first battery BT1 and the second battery BT2 by a power line, the battery BT can further include a third battery BT3 that is configured to supply electric power to the operating device 20. The third battery BT3 supplies electric power to the operating device 20, for example, in a case where the operating device 20 performs wireless communication with the transmission device 30.

In an example, the first battery BT1 and the second battery BT2 have different power capacities. In a case where the transmission device 30 is electrically connected to the first battery BT1 and the second battery BT2, the controller 52 can be configured to give priority to the battery BT having the larger power capacity for supplying electric power to the transmission device 30. In a case where the component 40 is electrically connected to the first battery BT1 and the second battery BT2, the controller 52 can be configured to give priority to the battery BT having the larger power capacity for supplying electric power to the component 40. In an example, the power capacity of the first battery BT1 is larger than the power capacity of the second battery BT2. The transmission device 30 and the component 40 can be electrically connected to the first battery BT1. In this configuration, in a case where the amount of power in the first battery BT1 is less than a predetermined value, the priority for being supplied with electric power can be given to one of the transmission device 30 and the component 40. Preferably, the first battery BT1 and the second battery BT2 are connected by a power line. The first battery BT1 and the second battery BT2 are configured so that in a case where the amount of power in one of the first battery BT1 and the second battery BT2 is less than the predetermined value, the power is supplied from the other one of the first battery BT1 and the second battery BT2.

The human-powered vehicle A includes the operating device 20, the transmission device 30, and the component 40, which differs from the operating device 20 and the transmission device 30. The component 40 further comprises a motor unit 42 configured to apply a propulsion force to the human-powered vehicle A. Preferably, the component 40 further includes at least one of a brake device 44, a suspension 46, and an adjustable seatpost 48.

The operating device 20 outputs a predetermined signal in accordance with operation of the user. The operating device 20 is provided on a steering mechanism of the human-powered vehicle A. The steering mechanism includes the handlebar H. The operating device 20 includes at least a shift operating device that operates the transmission device 30. The shift operating device includes at least one of a shifter and a switch. The shift operating device outputs a signal including information related to shifting that controls the transmission device 30 in accordance with operation of the user. The shift operating device sends a signal including information related to shifting via the first communication device 12. In other words, as seen in FIG. 2, the operating device 20 is configured to communicate with the transmission device 30 using a wireless signal. The operating device 20 further includes a component operating device that operates the component 40 of the human-powered vehicle A. In a case where the component 40 includes the motor unit 42, the component operating device sends a signal including information related to an output of a motor in relation to human driving force via the first communication device 12. In a case where the component 40 includes the brake device 44, the component operating device sends a signal including information related to braking via the first communication device 12. In a case where the component 40 includes the suspension 46, the component operating device sends a signal including information related to actuation of the suspension 46 via the first communication device 12. In a case where the component 40 includes the adjustable seatpost 48, the component operating device sends a signal including information related to height of the adjustable seatpost 48 via the first communication device 12. The first communication device 12 connected to the operating device 20 can be a single first communication device 12 connected to two or more operating devices 20 or can be two or more first communication units 12 connected to two or more operating devices 20.

The transmission device 30 includes an external transmission device. The external transmission device is configured to change a transmission ratio, which is defined by at least one of the number of teeth and the diameter of each of a front sprocket and a rear sprocket around which the chain D3 runs. The front sprocket is part of the front sprocket assembly D1 including one or more front sprockets. The rear sprocket is part of the rear sprocket assembly D2 including one or more rear sprockets. In an example, the transmission device 30 includes at least one of a front derailleur 32 and a rear derailleur 34. The front derailleur 32 is provided in the vicinity of the front sprocket assembly D1. The front derailleur 32 is actuated to change the front sprocket on which the chain D3 runs, thereby changing transmission ratio. The transmission ratio is determined based on the relationship between the number of teeth on the front sprocket and the number of teeth on the rear sprocket. In an example, the transmission ratio is determined by the ratio of a rotational speed of the rear sprocket to a rotational speed of the front sprocket. More specifically, the transmission ratio is defined by the ratio of the number of teeth on the front sprocket to the number of teeth on the rear sprocket. The rear derailleur 34 is provided on a rear end A3 of the frame A1. The rear derailleur 34 is actuated to change the rear sprocket on which the chain D3 runs, thereby changing the transmission ratio. The transmission device 30 can include an internal transmission device instead of the external transmission device. In this case, the internal transmission device is provided on, for example, the hub HR of the rear wheel WR. The transmission device 30 can include a stepless transmission device instead of the external transmission device. In this case, the stepless transmission device is provided on, for example, the hub HR of the rear wheel WR. The transmission device 30 changes the transmission ratio of the human-powered vehicle A in accordance with an operating signal from the shift operating device.

The motor unit 42 is actuated to assist in propulsion of the human-powered vehicle A. The motor unit 42 is actuated in accordance with, for example, human driving force applied to the pedals PD. The motor unit 42 includes a motor such as an electric motor. The motor unit 42 is actuated by electric power supplied from the battery BT mounted on the human-powered vehicle A. The component operating device includes a motor unit operating device that operates the motor unit 42. The motor unit operating device outputs an operating signal that changes a control state of the motor unit 42 and assisting force.

The brake device 44 includes brake devices 44, the number of which corresponds to the number of wheels W. The brake device 44 includes a brake device 44 corresponding to the front wheel WF and a brake device 44 corresponding to the rear wheel WR. The two brake devices 44 can have the same configuration. Each brake device 44 is, for example, a rim brake device that brakes a rim of the human-powered vehicle A. The component operating device incudes a brake operating device. Each brake device 44 is electrically driven based on a signal that is output in response to corresponding operation of the brake operating device. Each brake device 44 can be a disc brake device that brakes a disc brake rotor mounted on the human-powered vehicle A.

The suspension 46 includes at least one of a front suspension and a rear suspension. The front suspension is actuated to dampen an impact that the front wheel WF receives from the ground. The rear suspension is actuated to dampen an impact that the rear wheel WR receives from the ground. The component operating device includes a suspension operating device. Each suspension 46 is electrically driven in accordance with corresponding operation of the suspension operating device. More specifically, at least one of the movement state, travel amount, damping force, and repulsive force of each suspension 46 is changed based on an operating signal that is output in response to corresponding operation of the suspension operating device.

The adjustable seatpost 48 is actuated to change the height of a saddle relative to the frame A1. The component operating device includes an adjustable seatpost operating device. The adjustable seatpost 48 is electrically driven based on an operating signal that is output in response to operation of the adjustable seatpost operating device.

Since the control device 50 is used to control the first communication device 12, the second communication device 14, and the third communication device 16, the control device 50 can be considered to be part of the communication system 10. Stated differently, the communication system 10 further includes the control device 50 that includes the controller 52, which is configured to control the first communication device 12, the second communication device 14, and the third communication device 16. The controller 52 controls at least one of the operating device 20 mounted on the human-powered vehicle A, the transmission device 30, and the component 40 mounted on the human-powered vehicle A.

The controller 52 includes at least one of a central processing device (CPU) and a micro processing device (MPU), Thus, the controller 52 includes at least one processor and at least one computer storage device (i.e., computer memory devices). The controller 52 can also control the transmission device 30 in accordance with operation of the shift operating device. The control device 50 further includes the storage 54 that stores various types of information. The storage 54 is any computer storage device or any non-transitory computer-readable medium with the sole exception of a transitory, propagating signal. For example, the storage 54 includes a nonvolatile memory and a volatile memory. The nonvolatile memory includes, for example, at least one of a read-only memory (ROM), an erasable programmable read only memory (EPROM), an electrically erasable programmable read-only memory (EEPROM), and a flash memory. The volatile memory includes, for example, a random access memory (RAM). The storage 54 stores, for example, various types of programs used for control and predetermined information.

In a first example, the control device 50 is provided on at least the transmission device 30. The control device 50 is provided on at least one of the front derailleur 32 and the rear derailleur 34. The controller 52 receives the first information via the second communication device 14 through wired or wireless communication. The controller 52 is configured so that the second communication device 14 sends a signal including the second information through wired or wireless communication and so that the third communication device 16, which is provided on the component 40, receives the signal sent from the second communication device 14. In the first example, each of the operating device 20 and the component 40 includes an electronic controller that differs from the controller 52 of the control device 50. In a second example, the control device 50 is provided on the component 40. In a case where the component 40 includes the motor unit 42, the control device 50 is provided, for example, on the motor unit 42. In an example, the control device 50 is accommodated in a housing 42A of the motor unit 42. In the second example, each of the operating device 20 and the transmission device 30 includes an electronic controller that differs from the controller 52 of the control device 50. The controller 52 receives a signal including the second information via the third communication device 16 through wired or wireless communication. In a third example, the control device 50 is provided on the battery BT. In the third example, the controller 52 can be arranged in a housing of the battery BT and be connected to the battery BT by terminals. In the third example, the controller 52 controls the battery BT and the component 40 based on information received by the third communication device 16. The controller 52 can be configured to send information related to control to an electronic controller that differs from the controller 52 provided on the component 40 through wired or wireless communication, and the controller 52 can be configured to process information included in a signal received by the third communication device 16 provided on the component 40 and send the signal to a further controller of the component 40. In this case, a signal that includes third information can be sent to the third communication device 16 provided on the component 40 based on a signal from the controller 52. The control device 50 is actuated by electric power supplied from the battery BT. The control device 50 is configured to perform wired or wireless communication with at least one of the first communication device 12, the second communication device 14, and the third communication device 16. FIG. 2 discloses the configuration of the first example of the control device 50.

The controller 52 controls the first communication device 12 to output the first information in response to operation of the operating device 20. The controller 52 controls the second communication device 14 to receive the first information and output the second information including at least some of the first information. The controller 52 controls the third communication device 16 to receive the second information.

The first information and the second information will be described. The first information and the second information include at least one of information related to the transmission device 30 and information related to the component 40. The information related to the transmission device 30 includes at least one of information related to a control state of the transmission device 30 and information for the controller 52 to control the transmission device 30. The information related to the control state of the transmission device 30 includes information of the present transmission ratio. The information for the controller 52 to control the transmission device 30 includes information of an operating signal related to the changing of the transmission ratio. The information related to the component 40 includes at least one of information related to a control state of the component 40 and information for the controller 52 to control the component 40. In a case where the component 40 includes the motor unit 42, information related to the motor unit 42 includes at least one of information related to a control state of the motor unit 42 and information for the controller 52 to control the motor unit 42. The control state of the motor unit 42 includes a first control state and a second control state that differs in assisting force from the first control state. Assisting force includes at least one of a maximum output value of the motor, a minimum output value of the motor, a maximum output torque of the motor, a minimum output torque of the motor, a response speed of the motor, a ratio of a motor output to human torque that is input to the human-powered vehicle A, and driving force of the motor in relation to human driving force that is input to the human-powered vehicle A. The information for the controller 52 to control the motor unit 42 includes information related to assisting force.

In a first example, the first information conforms to the second information. In an example, the first information and the second information include the information related to the transmission device 30 and the information related to the component 40. In another example, the first information and the second information include one of the information related to the transmission device 30 and the information related to the component 40. In a second example, the first information differs from the second information. The controller 52 is configured to change the contents of the second information. In an example, the first information includes the information related to the transmission device 30 and the information related to the component 40, and the second information includes only the information related to the component 40. In another example, the first information includes only the information related to the transmission device 30, and the second information includes the information related to the transmission device 30 and the information related to the component 40.

A sending process of the first information and the second information executed by the controller 52 will be described. The controller 52 sends the first information to the second communication device 14 on a wireless signal or a wire signal. The controller 52 sends the first information from the transmitter of the first communication device 12. The controller 52 sends the first information to the second communication device 14 on a wire signal in a case where the operating device 20 and the transmission device 30 are wire-connected. The controller 52 outputs the first information on a wireless signal in a case where the operating device 20 and the transmission device 30 are not wire-connected. In other words, in this way, the operating device 20 is configured to communicate with the transmission device 30 using a wireless signal.

The controller 52 sends the second information to the third communication device 16 on a wireless signal or a wire signal. The controller 52 sends the second information from the transmitter of the second communication device 14. The controller 52 sends the second information to the third communication device 16 on a wire signal in a case where the transmission device 30 and the component 40 are wire-connected. The controller 52 outputs the second information on a wireless signal in a case where the transmission device 30 and the component 40 are not wire-connected.

The controller 52 can send any combination of a wire signal and a wireless signal. In a first example, the controller 52 controls the second communication device 14 so that the second communication device 14 receives the first information output from the first communication device 12 on a wire signal and sends the second information output from the second communication device 14 to the third communication device 16 on a wire signal. In a second example, the controller 52 controls the second communication device 14 so that the second communication device 14 receives the first information output from the first communication device 12 on a wireless signal and sends the second information output from the second communication device 14 to the third communication device 16 on a wireless signal. In a third example, the controller 52 controls the second communication device 14 so that the second communication device 14 receives the first information output from the first communication device 12 on a wire signal and sends the second information output from the second communication device 14 to the third communication device 16 on a wireless signal. In a fourth example, the controller 52 controls the second communication device 14 so that the second communication device 14 receives the first information output from the first communication device 12 on a wireless signal and sends the second information output from the second communication device 14 to the third communication device 16 on a wire signal.

Control of the operating device 20, the transmission device 30, and the component 40 executed by the controller 52 will now be described. The controller 52 controls the supply of electric power from the battery BT. The controller 52 controls the supply of electric power from the battery BT to at least one of the operating device 20, the transmission device 30, and the component 40 based on at least one of the first information and the second information. In an example, in a case where at least one of the first information and the second information includes the information related to the transmission device 30, the controller 52 supplies electric power to the operating device 20 and the transmission device 30 from the battery BT. In a case where each of the first information and the second information includes the information related to the transmission device 30, the controller 52 changes the amount of power supplied from the battery BT to at least one of the operating device 20 and the transmission device 30 from that in a case where the information related to the transmission device 30 is not included. In an example, in a case where the first communication device 12 of the operating device 20 and the second communication device 14 of the transmission device 30 are wire-connected and the information related to the transmission device 30 is included, the controller 52 increases the amount of power supplied to the operating device 20 and the transmission device 30 as compared to in a case where the information related to the transmission device 30 is not included. In a case where the first communication device 12 of the operating device 20 and the second communication device 14 of the transmission device 30 are wireless-connected and the information related to the transmission device 30 is included, the controller 52 increases the amount of power supplied to the transmission device 30 as compared to in a case where the information related to the transmission device 30 is not included. While electric power is supplied from the battery BT, the controller 52 controls the electric power to be supplied to the operating device 20. In a case where the second information includes the information related to the component 40, the controller 52 supplies electric power to the component 40 from the battery BT. In a case where the second information does not include the information related to the component 40, the controller 52 can change the amount of power supplied to the component 40 from the battery BT from that in a case where the second information includes the information related to the component 40.

The controller 52 controls the supply of electric power from the first battery BT1 and the second battery BT2 based on at least one of the first information and the second information. In an example, in a case where at least one of the first information and the second information includes the information related to the transmission device 30, the controller 52 supplies electric power from the second battery BT2 to the transmission device 30. In a case where each of the first information and the second information includes the information related to the transmission device 30, the controller 52 changes the amount of power supplied to the transmission device 30 from the second battery BT2 from that in a case where the information related to the transmission device 30 is not included. In an example, in a case where the information related to the transmission device 30 is included, the controller 52 increases the amount of power supplied to the transmission device 30 as compared to in a case where the information related to the transmission device 30 is not included. In a case where the second information includes the information related to the component 40, the controller 52 supplies electric power from the first battery BT1 to the component 40. In a case where the second information does not include the information related to the component 40, the controller 52 can change the amount of power supplied from the first battery BT1 to the component 40 from that in a case where the second information includes the information related to the component 40.

The controller 52 controls the transmission device 30 and the component 40 based on at least one of the first information and the second information. In an example, in a case where at least one of the first information and the second information includes information for controlling the transmission device 30, the transmission device 30 is controlled based on the information for controlling the transmission device 30. In a case where the second information includes information for controlling the component 40, the controller 52 controls the component 40 based on the information for controlling the component 40.

An example of control executed by the controller 52 of the first embodiment will now be described with reference to FIG. 3. While electric power is supplied from the battery BT, the controller 52 cyclically executes the process from steps S11 to S18.

In step S11, the controller 52 determines whether the operating device 20 is operated. In a case where the determination is affirmative, the controller 52 executes step S12. In a case where the determination is negative, the controller 52 again executes step S11.

In step S12, the controller 52 determines whether the operating device 20 and the transmission device 30 are wire-connected. The controller 52 can, for example, detect which one of the batteries BT is supplying electric power to the operating device 20 to determine whether the operating device 20 and the transmission device 30 are wire-connected. In a case where the determination is affirmative, the controller 52 executes step S13. In a case where the determination is negative, the controller 52 executes step S14.

In step S13, the controller 52 outputs the first information from the first communication device 12 on a wire signal. Subsequent to step S13, the controller 52 executes step S15. In step S14, the controller 52 outputs the first information from the first communication device 12 on a wireless signal. Subsequent to step S14, the controller 52 executes step S15.

In step S15, the controller 52 determines whether the transmission device 30 and the component 40 are wire-connected. In a case where the determination is affirmative, the controller 52 executes step S16. In a case where the determination is negative, the controller 52 executes step S17.

In step S16, the controller 52 outputs the second information from the second communication device 14 on a wire signal. Subsequent to step S16, the controller 52 executes step S18. In step S17, the controller 52 outputs the second information from the second communication device 14 on a wireless signal. Subsequent to step S17, the controller 52 executes step S18.

In step S18, the controller 52 controls the transmission device 30 and the component 40 based on at least one of the first information and the second information. Subsequent to step S18, the controller 52 ends the control.

Second Embodiment

A second embodiment of the communication system 10 and the control device 50 will be described with reference to FIGS. 4 to 7. The communication system 10 and the control device 50 of the second embodiment is the same as the communication system 10 and the control device 50 of the first embodiment except for the configurations of the controller 52 and the battery BT. Same reference characters are given to those configurations that are the same as the corresponding configurations of the first embodiment. Such configurations will not be described in detail.

Figure 4:
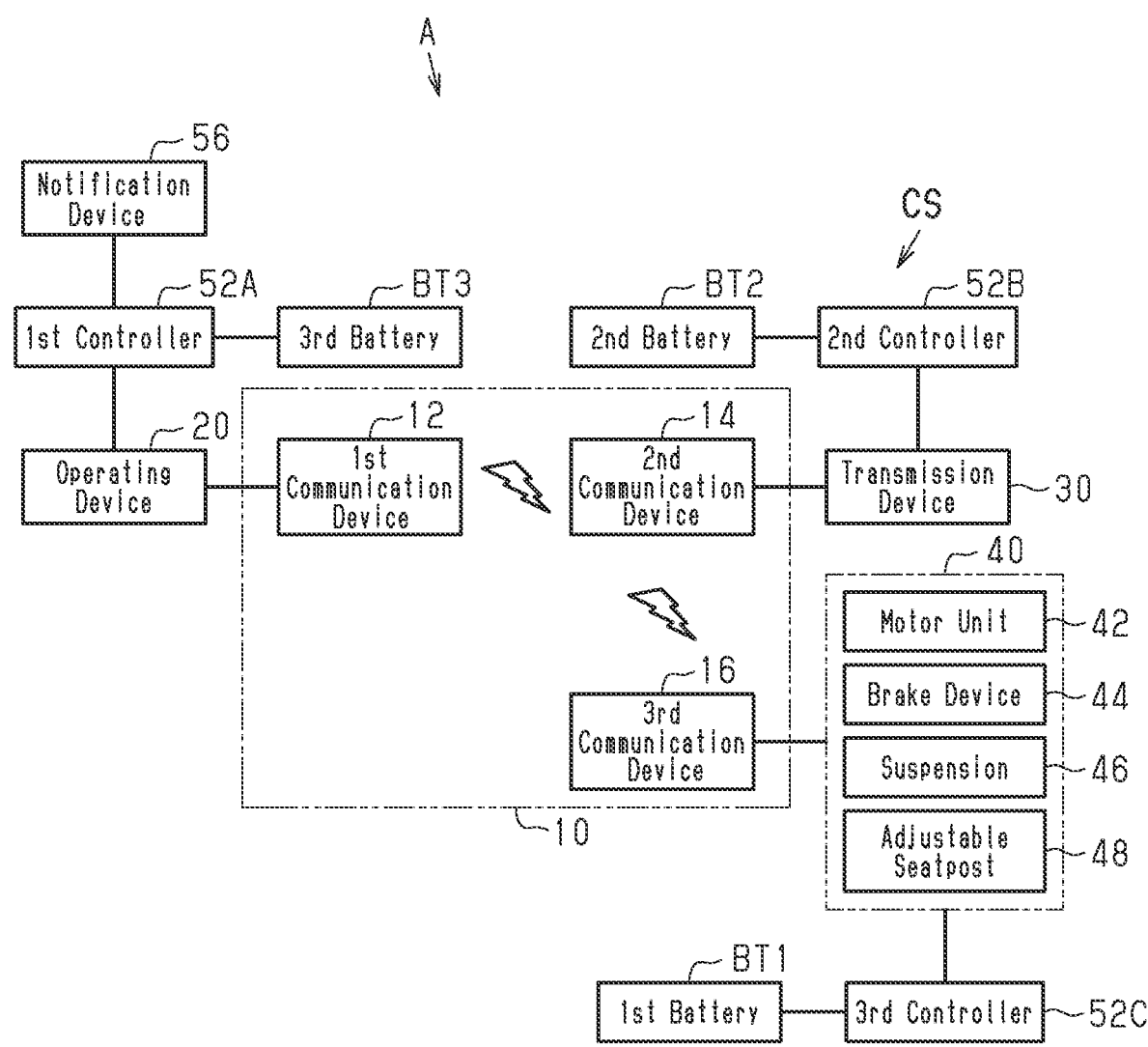
FIG. 4 is a block diagram showing an electrical connection relationship between a control device and various components in accordance with a second embodiment.

As shown in FIG. 4, the controller 52 includes a first controller 52A, a second controller 52B, and a third controller 52C. The first controller 52A controls the operating device 20, the first communication device 12 connected to the operating device 20, and a notification device 56. The second controller 52B controls the transmission device 30 and the second communication device 14 connected to the transmission device 30. The third controller 52C controls the component 40 and the third communication device 16 connected to the component 40.

The first controller 52A is provided on the operating device 20. The first controller 52A outputs the first information in response to operation of the operating device 20. In a case where the first communication device 12 receives the third information, the first controller 52A controls the notification device 56 so that the third information is indicated on the notification device 56.

The notification device 56 includes an indicator. The indicator includes, for example, an indication panel. The notification device 56 includes, for example, at least one of a portable electronic device, a display, a smartphone, a tablet computer, and a cycle computer. The notification device 56 can include a speaker. The notification device 56 is configured to perform wired or wireless communication with at least the first communication device 12.

The battery BT further includes the third battery BT3 that supplies electric power to at least one of the first communication device 12, the operating device 20, the first controller 52A, and the notification device 56. The third battery BT3 has a smaller power capacity than the first battery BT1 and the second battery BT2. In an example, the third battery BT3 includes a lithium-ion battery. In another example, the third battery BT3 includes a button cell or coin battery.

The second controller 52B is provided on the transmission device 30. In an example, the second controller 52B is provided on one of the front derailleur 32 and the rear derailleur 34. The second controller 52B controls the transmission device 30. In a case where the first information is received, the second controller 52B outputs the second information to the third communication device 16. In a case where the third information is received, the second controller 52B outputs the third information to the first communication device 12.

The third controller 52C is provided on the component 40. In a case where multiple components 40 are provided on the human-powered vehicle A, the third controller 52C can be provided on each component 40 or one of the components 40. The third controller 52C controls the component 40. The third controller 52C sends the third information from the third communication device 16. In a case where the third communication device 16 performs wired communication with the second communication device 14, the third controller 52C outputs the third information from the third communication device 16 to the second communication device 14. The third information includes information related to a state of the component 40. In an example, in a case where the component 40 includes the motor unit 42, information related to the control state of the motor and assisting force is included. In a case where the component 40 includes the brake device 44, information related to braking force is included. In a case where the component 40 includes the suspension 46, information related to the movement state, travel amount, damping force, and repulsive force is included. In a case where the component 40 includes the adjustable seatpost 48, information related to the height of the saddle relative to the frame A1 is included.

Figure 5:
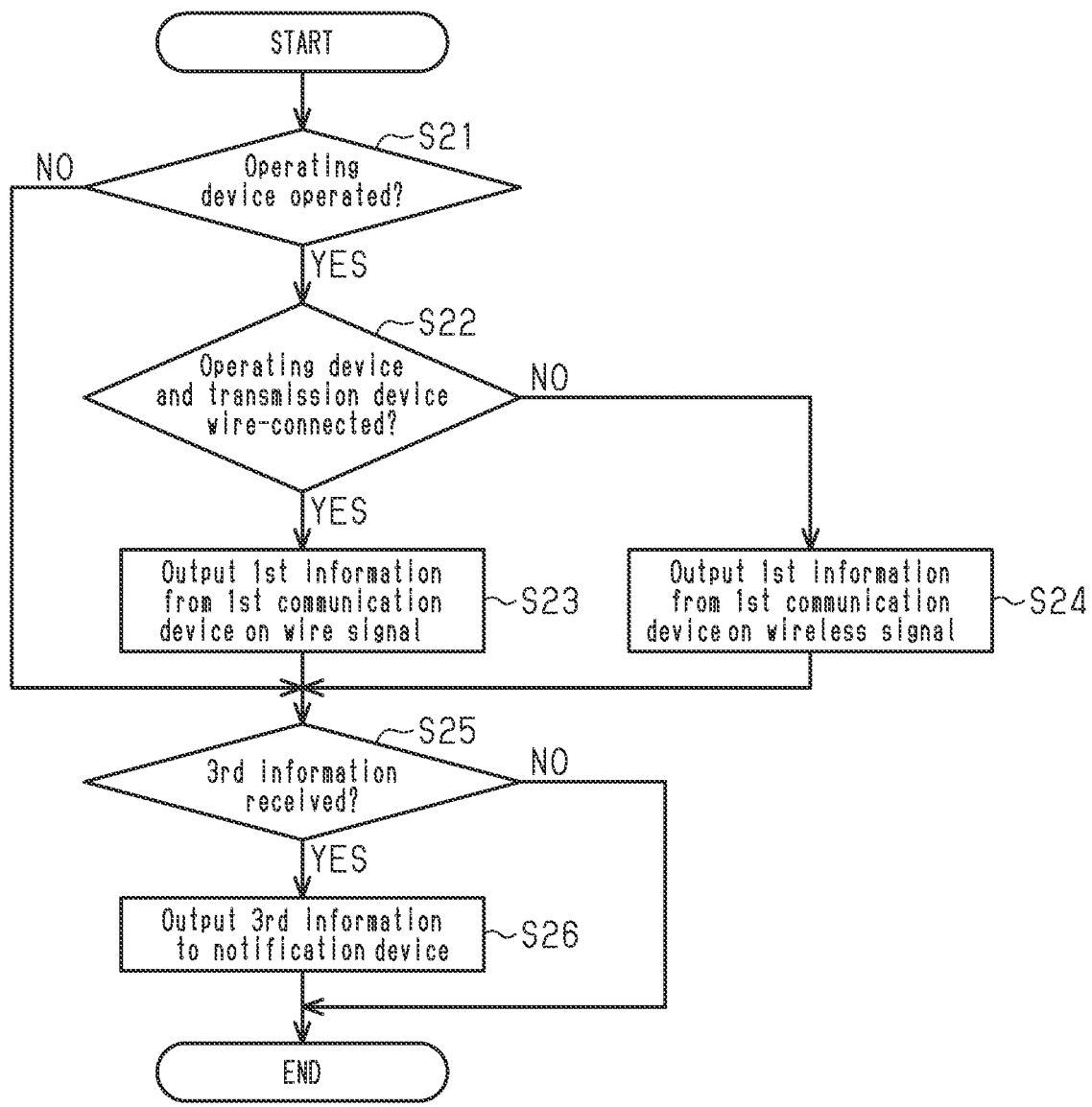
FIG. 5 is a flowchart showing an example of control executed by a first electronic controller of the second embodiment.

An example of control executed by the first controller 52A will now be described with reference to FIG. 5. While electric power is supplied from the battery BT, the first controller 52A repeatedly executes the process from steps S21 to S26.

In step S21, the first controller 52A determines whether the operating device 20 is operated. In a case where the determination is affirmative, the first controller 52A executes step S22. In a case where the determination is negative, the first controller 52A executes step S25.

The process from steps S22 to S24 executed by the first controller 52A is the same as the process from steps S12 to S14 executed by the controller 52 of the first embodiment.

In step S25, the first controller 52A determines whether the third information is received. In a case where the determination is affirmative, the first controller 52A executes step S26. In a case where the determination is negative, the first controller 52A ends the control.

In step S26, the first controller 52A outputs the third information to the notification device 56. Subsequent to step S26, the first controller 52A ends the control.

Figure 6:
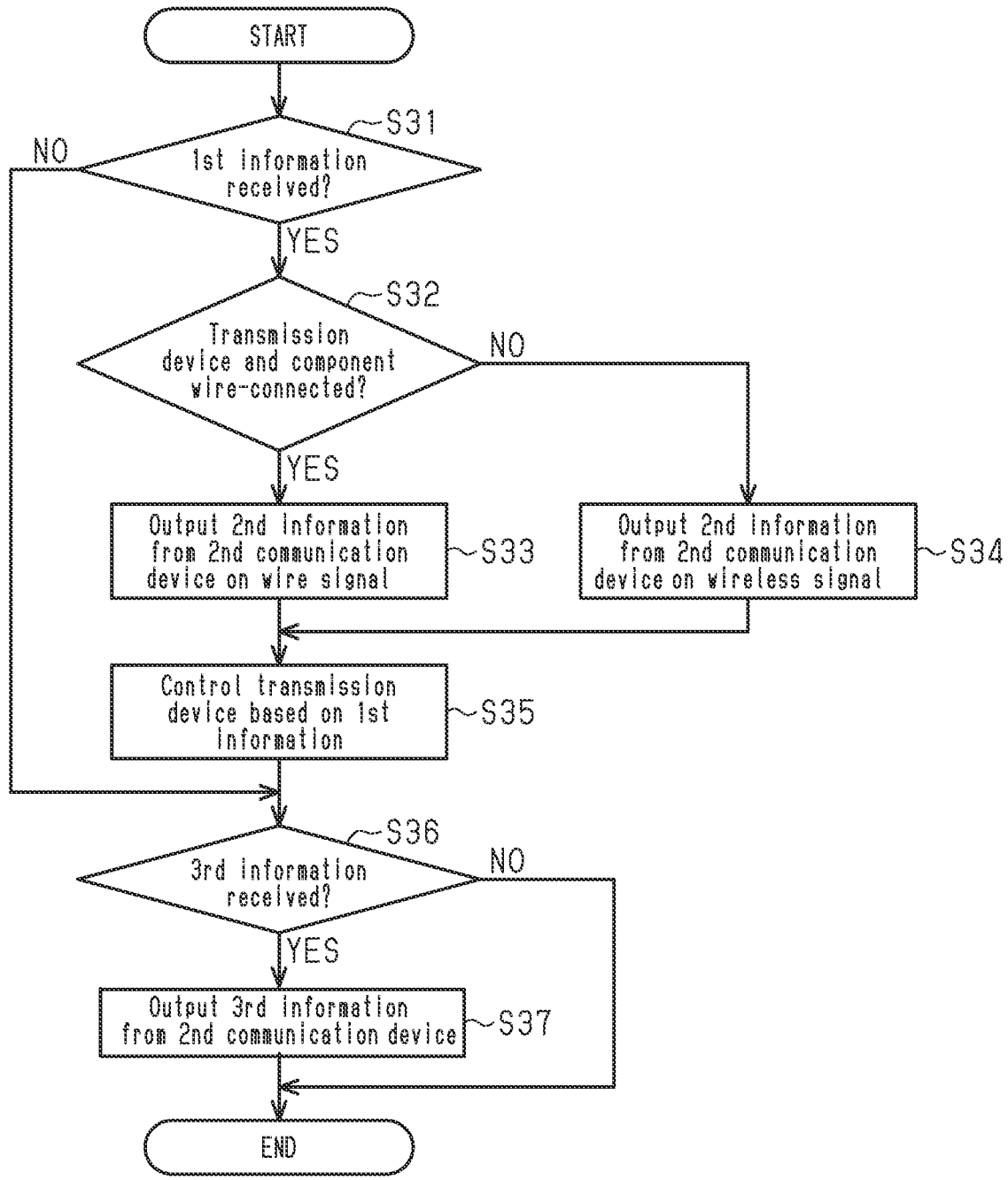
FIG. 6 is a flowchart showing an example of control executed by a second electronic controller of the second embodiment.

An example of control executed by the second controller 52B will now be described with reference to FIG. 6. While electric power is supplied from the battery BT, the second controller 52B repeatedly executes the process from steps S31 to S37.

In step S31, the second controller 52B determines whether the first information is received. In a case where the determination is affirmative, the second controller 52B executes step S32. In a case where the determination is negative, the second controller 52B executes step S36.

The process from steps S32 to S34 executed by the second controller 52B is the same as the process from steps S15 to S17 executed by the controller 52 of the first embodiment.

In step S35, the second controller 52B controls the transmission device 30 based on the first information. Subsequent to step S35, the second controller 52B executes step S36.

In step S36, the second controller 52B determines whether the third information is received. In a case where the determination is affirmative, the second controller 52B executes step S37. In a case where the determination is negative, the second controller 52B ends the control.

In step S37, the second controller 52B outputs the third information from the second communication device 14 to the first communication device 12. Subsequent to step S37, the second controller 52B ends the control.

Figure 7:
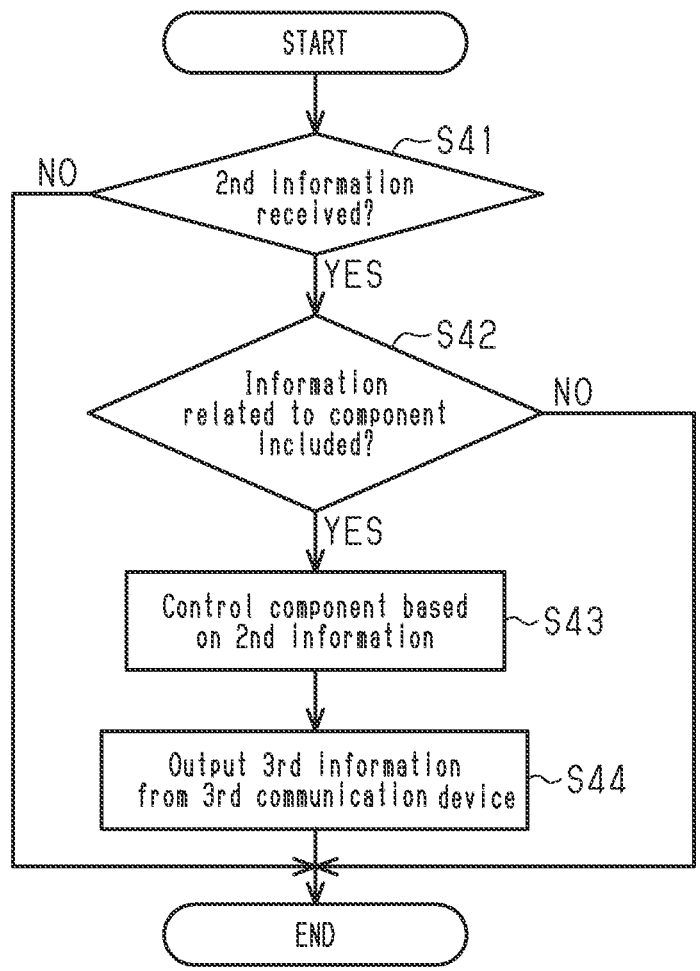
FIG. 7 is a flowchart showing an example of control executed by a third electronic controller of the second embodiment.

An example of control executed by the third controller 52C will now be described with reference to FIG. 7. While electric power is supplied from the battery BT, the third controller 52C repeatedly executes the process from steps S41 to S44.

In step S41, the third controller 52C determines whether the second information is received. In a case where the determination is affirmative, the third controller 52C executes step S42. In a case where the determination is negative, the third controller 52C ends the control.

In step S42, the third controller 52C determines whether the information related to the component 40 is included. In a case where the determination is affirmative, the third controller 52C executes step S43. In a case where the determination is negative, the third controller 52C ends the control.

In step S43, the third controller 52C controls the component 40 based on the second information. Subsequent to step S43, the third controller 52C executes step S44.

In step S44, the third controller 52C outputs the third information from the third communication device 16 toward the second communication device 14. Subsequent to step S44, the third controller 52C ends the control.

Third Embodiment

Figure 8:
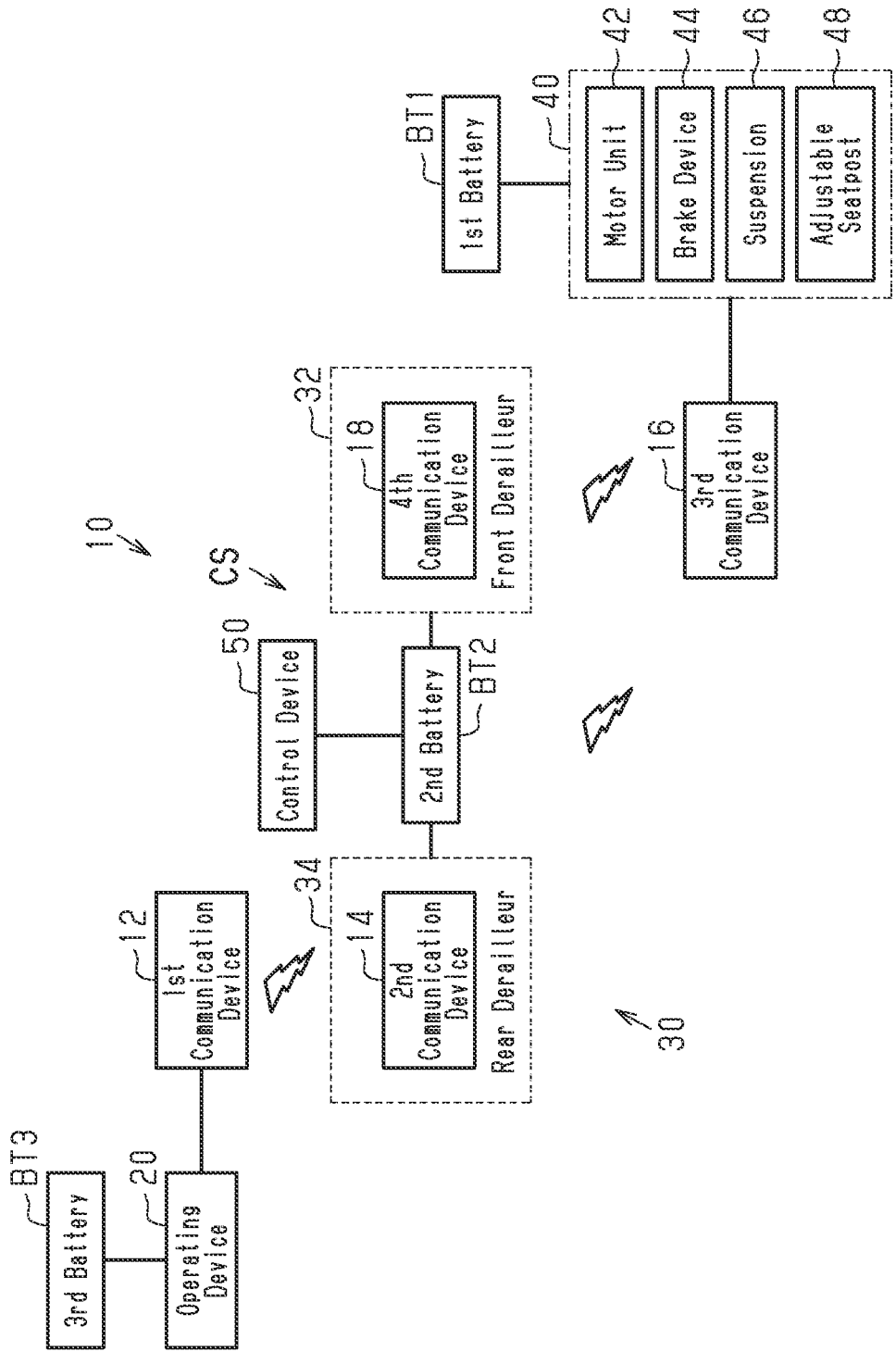
FIG. 8 is a block diagram showing an electrical connection relationship between a control device and various components in accordance with a third embodiment.

A third embodiment of the communication system 10 and the control device 50 will be described with reference to FIG. 8. The communication system 10 and the control device 50 of the third embodiment further includes a fourth communication device 18 provided on the transmission device 30. The same reference characters are given to those configurations that are the same as the corresponding configurations of the first and second embodiments. Such configurations will not be described in detail.

The communication system 10 further includes the fourth communication device 18. The fourth communication device 18 is provided on the transmission device 30. The fourth communication device 18 includes at least a receiver configured to receive a signal that includes information. Preferably, the fourth communication device 18 includes a transmitter configured to transmit a signal that includes information. The fourth communication device 18 is provided on one of the front derailleur 32 and the rear derailleur 34 of the transmission device 30, and the second communication device 14 is provided on the other one of the front derailleur 32 and the rear derailleur 34. In an example, the second communication device 14 is provided on the rear derailleur 34, and the fourth communication device 18 is provided on the front derailleur 32. The fourth communication device 18 is configured to perform wired or wireless communication with the third communication device 16. The fourth communication device 18 can be configured to perform wired or wireless communication with at least one of the first communication device 12 and the second communication device 14. In an example, the fourth communication device 18 is configured to communicate with the second communication device 14. In a case where the second communication device 14 is configured to communicate with the third communication device 16 and the fourth communication device 18, the third communication device 16 and the fourth communication device 18 can be configured not to communicate with each other.

Transmission of a signal including information in the communication system 10 of the third embodiment will now be described. Transmission and reception performed by each communication device is controlled by the controller 52 of the control device 50 or a controller (not shown) provided on each of the operating device 20, the transmission device 30, and the component 40.

The first communication device 12 performs wired or wireless communication with the second communication device 14 provided on the rear derailleur 34. In an example, the first communication device 12 performs wireless communication with the second communication device 14. The first communication device 12 sends a signal including first information to the second communication device 14. The first information includes at least one of information related to the transmission device 30 and information related to the component 40.

The second communication device 14 performs wired or wireless communication with the third communication device 16 provided on the component 40. In an example, the second communication device 14 performs wired communication with the third communication device 16. The second communication device 14 sends a signal including second information to the third communication device 16. The second information includes at least one of information related to the transmission device 30 and information related to the component 40. The second communication device 14 can send the second information to the fourth communication device 18 through the electrically connected second battery BT2 and a power line. The second battery BT2 further includes a communication device that includes both a transmitter configured to transmit a signal including information and a receiver configured to receive a signal including information.

The third communication device 16 communicates with at least one of the fourth communication device 18 provided on the front derailleur 32 and the second communication device 14. The third communication device 16 performs wired or wireless communication with the fourth communication device 18. In an example, the third communication device 16 performs wired communication with the fourth communication device 18. In a case where the received second information includes the information related to the transmission device 30, the third communication device 16 sends a signal including the information related to the transmission device 30 to at least one of the second communication device 14 and the fourth communication device 18. In a case where the second communication device 14 communicates with the fourth communication device 18, the third communication device 16 can be configured not to perform wired and wireless communication with the fourth communication device 18.

The first battery BT1 supplies electric power to the component 40 and the third communication device 16. The second battery BT2 supplies electric power to at least the front derailleur 32, the rear derailleur 34, the second communication device 14, and the fourth communication device 18. The third battery BT3 supplies electric power to the operating device 20 and the first communication device 12. The third battery BT3 includes, for example, a button cell or coin battery. In a case where the first communication device 12 and the second communication device 14 are connected by a power line that allows for power line communication, the second battery BT2 supplies electric power to the operating device 20 and the first communication device 12.

Fourth Embodiment

Figure 9:
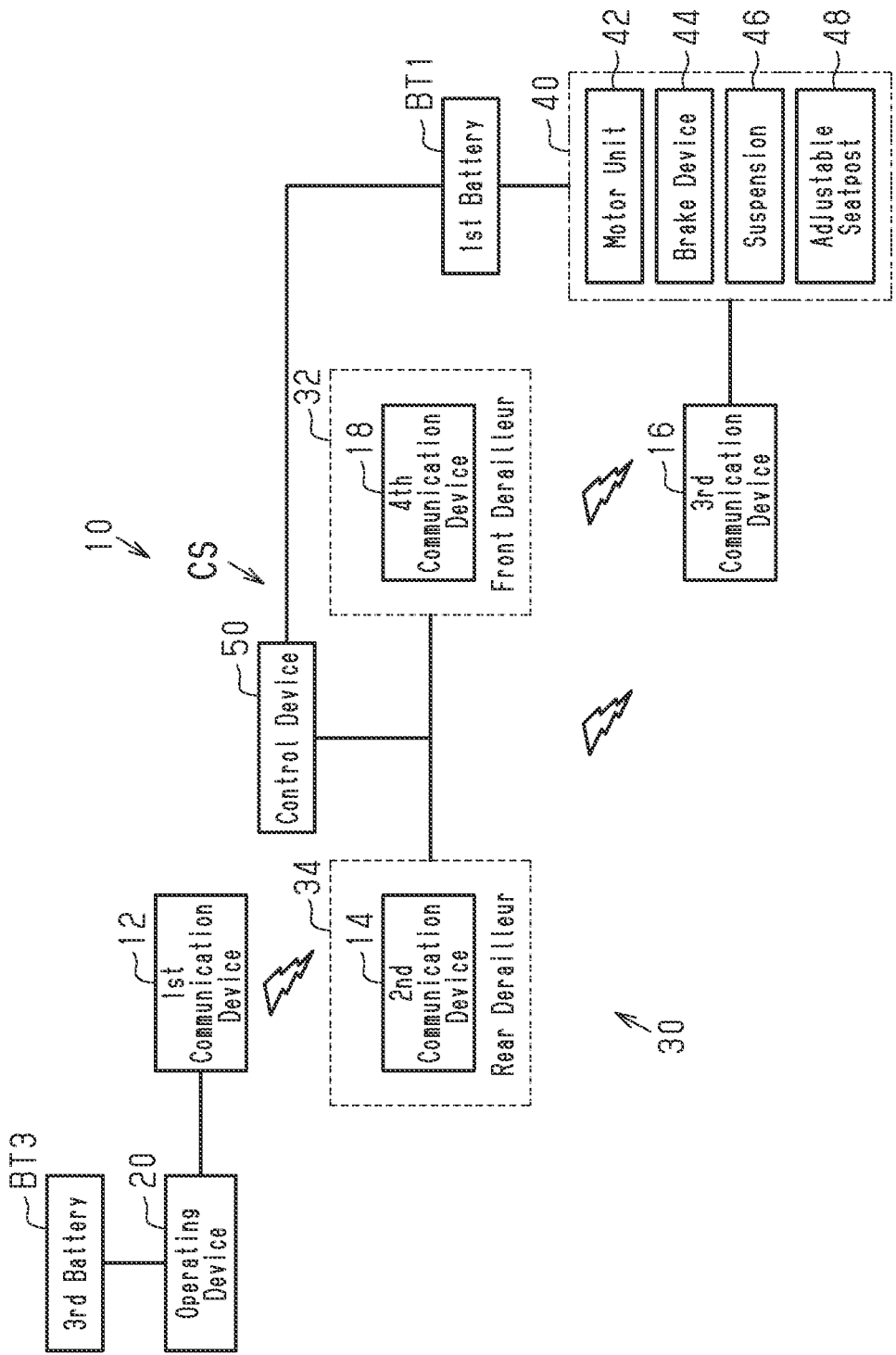
FIG. 9 is a block diagram showing an electrical connection relationship between a control device and various components in accordance with a fourth embodiment.

A fourth embodiment of the communication system 10 and the control device 50 will be described with reference to FIG. 9. The communication system 10 and the control device 50 of the fourth embodiment do not include the second battery BT2 of the third embodiment. Same reference characters are given to those configurations that are the same as the corresponding configurations of the first to third embodiments. Such configurations will not be described in detail.

Transmission of a signal including information in the communication system 10 of the fourth embodiment will now be described. Transmission and reception performed by each communication device is controlled by the controller 52 of the control device 50 or a controller (not shown) provided on each of the operating device 20, the transmission device 30, and the component 40.

The first communication device 12 performs wired or wireless communication with the second communication device 14 provided on the rear derailleur 34. In an example, the first communication device 12 performs wireless communication with the second communication device 14. The first communication device 12 sends a signal including first information to the second communication device 14. The first information includes at least one of information related to the transmission device 30 and information related to the component 40.

The second communication device 14 performs wired or wireless communication with the third communication device 16 provided on the component 40. In an example, the second communication device 14 performs wired communication with the third communication device 16. The second communication device 14 sends a signal including second information to the third communication device 16. The second information includes at least one of information related to the transmission device 30 and information related to the component 40. The second communication device 14 can send the second information to the fourth communication device 18 by a power line that electrically connects the second communication device 14 and the fourth communication device 18.

The third communication device 16 communicates with at least one of the fourth communication device 18 provided on the front derailleur 32 and the second communication device 14. The third communication device 16 performs wired or wireless communication with the fourth communication device 18. In an example, the third communication device 16 performs wired communication with the fourth communication device 18. In a case where the received second information includes the information related to the transmission device 30, the third communication device 16 sends a signal including the information related to the transmission device 30 to at least one of the second communication device 14 and the fourth communication device 18. In a case where the second communication device 14 communicates with the fourth communication device 18, the third communication device 16 can be configured not to perform wired and wireless communication with the fourth communication device 18.

The first battery BT1 supplies electric power to the component 40, the front derailleur 32, the rear derailleur 34, the second communication device 14, the third communication device 16, and the fourth communication device 18. The second battery BT2 is omitted or integrated with the first battery BT1. The third battery BT3 supplies electric power to the operating device 20 and the first communication device 12. The third battery BT3 includes, for example, a button cell or coin battery. In a case where the first communication device 12 and the second communication device 14 are connected by a power line that allows for power line communication, the first battery BT1 supplies electric power to the operating device 20 and the first communication device 12.

Modifications

The description related to the above embodiments exemplifies, without any intention to limit, applicable forms of a communication system and a control device according to the present disclosure. The communication system and the control device according to the present disclosure can be applied to, for example, modifications of the embodiments that are described below and combinations of at least two of the modified examples that do not contradict each other. In the modifications described hereinafter, same reference characters are given to those elements that are the same as the corresponding elements of the above embodiment. Such elements will not be described in detail.

The receiver and the transmitter of the second communication device 14 can be configured separately from each other. In an example, the receiver of the second communication device 14 is provided on the front derailleur 32, and the transmitter of the second communication device 14 is provided on the rear derailleur 34. In another example, the receiver of the second communication device 14 is provided on the rear derailleur 34, and the transmitter of the second communication device 14 is provided on the front derailleur 32.

The third communication device 16 can be provided on the battery BT. In an example, the third communication device 16 is provided on the first battery BT1. The third communication device 16 and the controller 52 configured to control the component 40 are wire-connected.

In the communication system 10 of the third embodiment and the communication system 10 of the fourth embodiment, in a case where the first communication device 12 and the second communication device 14 are wire-connected, wired communication and the wireless communication can be configured to be switched. Even in a case where the first communication device 12 and the second communication device 14 are wire-connected, the operating device 20 and the controller 52 are configured to control the first communication device 12 to send a wireless signal to the second communication device 14. In this case, electric power can be configured to be supplied from one of the first battery BT1 and the second battery BT2 that is electrically connected to the operating device 20 and the first communication device 12. Wired communication and wireless communication are configured to be switched, for example, by operation of the operating device 20.

In the communication system 10 of the third embodiment and the communication system 10 of the fourth embodiment, the second communication device 14 and the fourth communication device 18 can be configured to perform wired or wireless communication with each other. In this case, a signal including information that is received by one of the second communication device 14 and the fourth communication device 18 is sent to the other one of the second communication device 14 and the fourth communication device 18.

Figure 10:
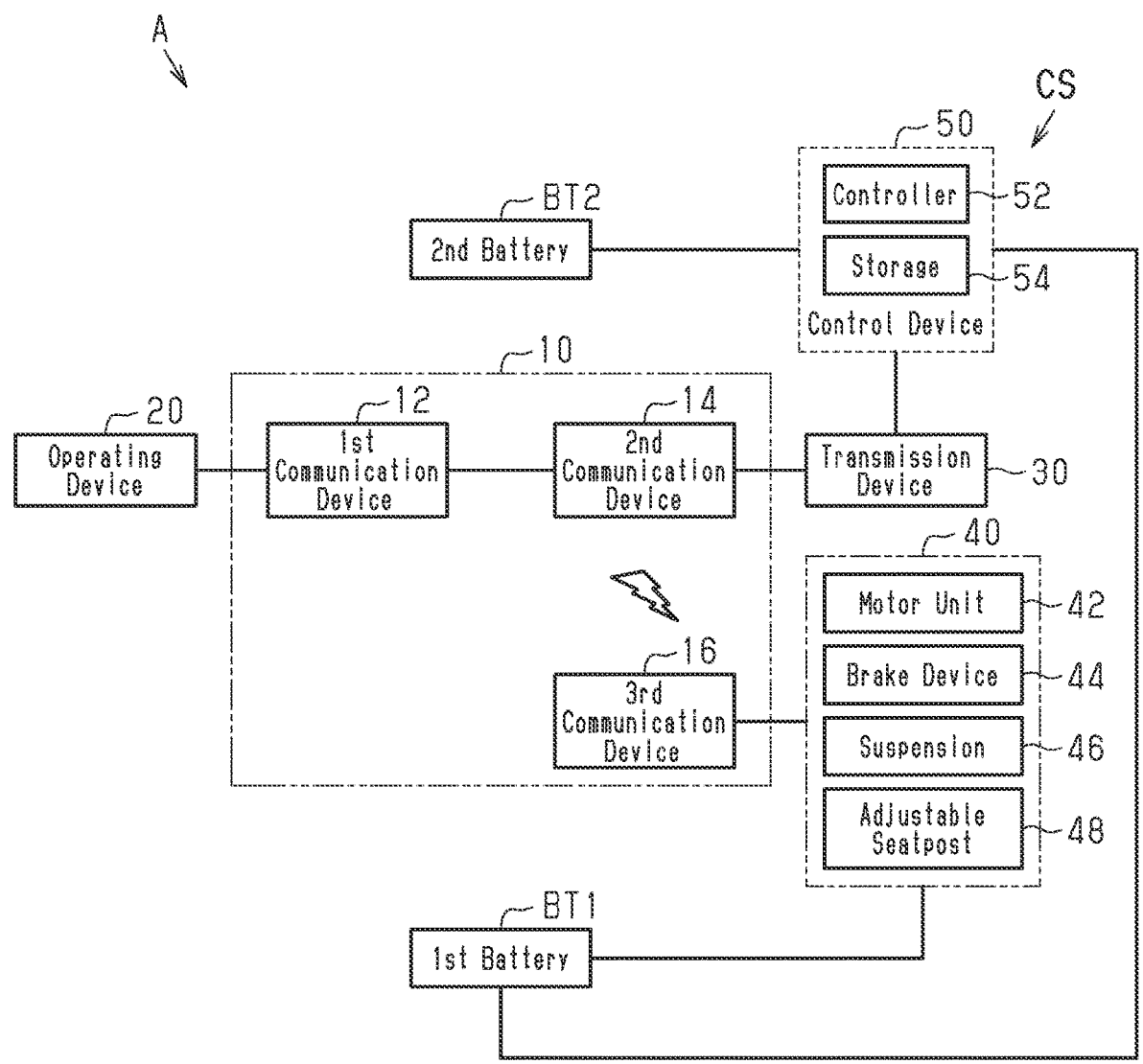
FIG. 10 is a block diagram showing an electrical connection relationship between a control device and various elements in a modified embodiment.

FIG. 10 shows a modified embodiment of a communication system 10 in which one of the first battery BT1 and the second battery BT2 is configured to supply electric power to the operating device 20. The first battery BT1 and the operating device 20 can be configured not to be directly connected by a power line. The first communication device 12 and the second communication device 14 are connected by a power line that allows for power line communication. One of the first battery BT1 and the second battery BT2 supplies electric power to the operating device 20 via the transmission device 30. The second battery BT2 can be omitted. The first battery BT1 can be configured to supply electric power to only the component 40, and the operating device 20 can be configured to be supplied with electric power from only the second battery BT2 via the transmission device 30.

In the communication system 10 including the fourth communication device 18, both the second communication device 14 and the fourth communication device 18 can receive the first information from the first communication device 12. Alternatively, one of the second communication device 14 and the fourth communication device 18 that performs wired communication with the first communication device 12 can receive the first information from the first communication device 12. It is preferred that one of the second communication device 14 and the fourth communication device 18 that performs wired communication with the third communication device 16 sends an output to the third communication device 16.

Even in a case where the communication system 10 is wire-connected, it can be configured to output a wireless signal. The controller 52 of the first embodiment skips step S12 and executes step S14 subsequent to step S11. The controller 52 skips step S15 and executes step S17. In the communication system 10 of the second embodiment, the first controller 52A and the second controller 52B execute the process in the same manner.

In the second embodiment, one of the first controller 52A, the second controller 52B, and the third controller 52C can be omitted. In a case where the first controller 52A is omitted, the second controller 52B controls the first communication device 12 and the second communication device 14. In a case where the second controller 52B is omitted, the first controller 52A controls the first communication device 12 and the second communication device 14. In a case where the third controller 52C is omitted, the second controller 52B controls the second communication device 14 and the third communication device 16.

In the second embodiment, the second controller 52B can control the transmission device 30 based on third information. In an example, the third information includes information related to output of the motor unit 42. The second controller 52B controls the transmission device 30 to decrease the transmission ratio in a case where the output of the motor unit 42 is large, and controls the transmission device 30 to increase the transmission ratio in a case where the output of the motor unit 42 is small.

In the second embodiment, the second controller 52B can be configured to skip step S35 and, subsequent to step S36, control the transmission device 30 based on the information related to the transmission device 30 included in the third information.

In this specification, the phrase "at least one of" as used in this disclosure means "one or more" of a desired choice. As one example, the phrase "at least one of" as used in this disclosure means "only one choice" or "both of two choices" in a case where the number of choices is two. In another example, in this specification, the phrase "at least one of" as used in this disclosure means "only one single choice" or "any combination of equal to or more than two choices" if the number of its choices is equal to or more than three.

What is claimed is:

1. A component configured to be mounted on a human-powered vehicle, the component comprising:
   a communication device configured to receive predetermined information sent from a transmission of the human-powered vehicle; and
   an electronic controller provided on the component the electronic controller being configured to control the component based on whether the predetermined information includes the information related to the component,
   the predetermined information including at least some of first information that the transmission receives from an operating device mounted to the human-powered vehicle, the operating device including a switch.

2. The component according to claim 1, wherein the communication device is configured to receive the predetermined information on a wireless signal.

3. The component according to claim 1, further comprising a motor unit configured to apply a propulsion force to the human-powered vehicle.

4. The component according to claim 1, wherein the operating device is configured to communicate with the transmission device using a wireless signal.

5. The component according to claim 1, wherein the communication device is connected to the transmission by a wire to communicate with the transmission using a wire signal.

6. The component according to claim 1, wherein the first information includes at least one of information related to the transmission and information related to the component.

7. The component according to claim 6, wherein the information related to the component is different from the information related to the transmission.

8. The component according to claim 1, wherein the predetermined information includes at least one of information related to the transmission and information related to the component.

9. The component according to claim 8, wherein the information related to the component is different from the information related to the transmission.

10. The component according to claim 1, wherein the first information conforms to the predetermined information.

11. The component according to claim 1, wherein the component is configured to receive a signal sent from the operating device.

12. A communication system comprising the component according to claim 1, and further comprising:
    at least one battery configured to supply electric power to at least one of the component, the operating device and the transmission.

13. The communication system according to claim 12, wherein the battery is configured to supply electric power to the component and the transmission.

14. The communication system according to claim 13, wherein the battery is configured to supply electric power to the component and the operating device.

15. The communication system according to claim 12, wherein the battery includes:
    a first battery configured to supply electric power to the transmission device and the component; and
    a third battery configured to supply electric power to the operating device.

16. A component configured to be mounted on a human-powered vehicle, the component comprising:

a communication device configured to receive predetermined information sent from a transmission of the human-powered vehicle; and
an electronic controller configured to control the component based on the predetermined information in a state where the predetermined information includes information related to the component,
the predetermined information including at least one of information related to the transmission and information related to the component that the transmission receives from an operating device mounted to the human-powered vehicle, the information related to the transmission being different from the information related to the component, the operating device including a switch.

17. The component according to claim 16, wherein
the information related to the transmission includes at least one of information related to a control state of the transmission and information for controlling the transmission, and
the information related to the component includes at least one of information related to a control state of the component and information controlling the component.

18. The component according to claim 17, wherein
the component is a motor unit configured to apply a propulsion force to the human-powered vehicle,
the information related to the control state of the transmission includes information indicating a current transmission ratio,
the information for controlling the transmission includes information of an operating signal related to the changing the transmission ratio,
the information related to the control state of the component includes a first control state and a second control state that differs in assisting force from the first control state, and
the information related to controlling the component includes information related to assisting force.

19. The component according to claim 16, wherein
the electronic controller is configured to determine whether the predetermined information includes the information related to the component and control the component based on the predetermined information only upon determining that the predetermined information includes the information related to the component.

* * * * *